O. P. GRANDE.
DISH DRAINER.
APPLICATION FILED MAR. 20, 1913.
1,165,665.
Patented Dec. 28, 1915.
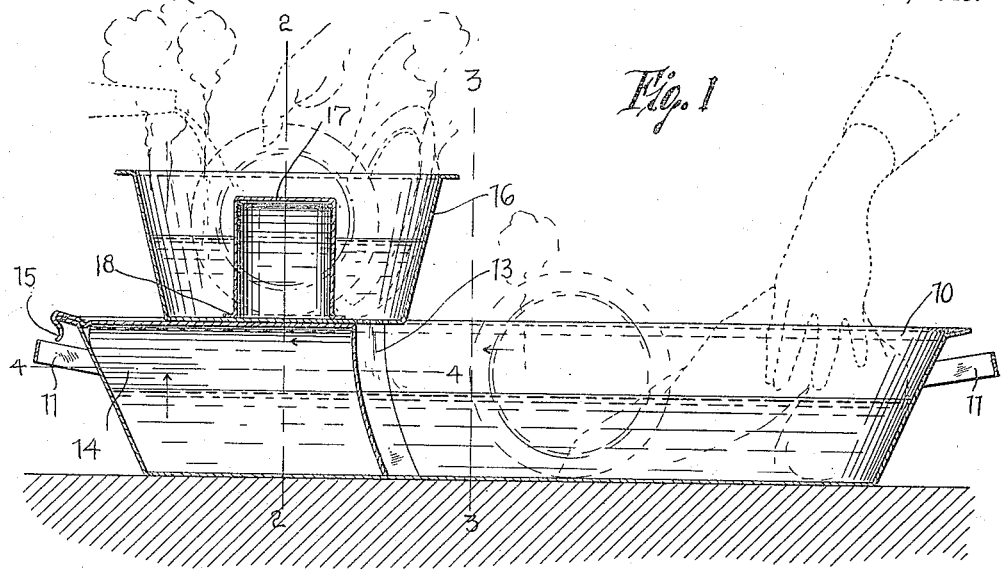
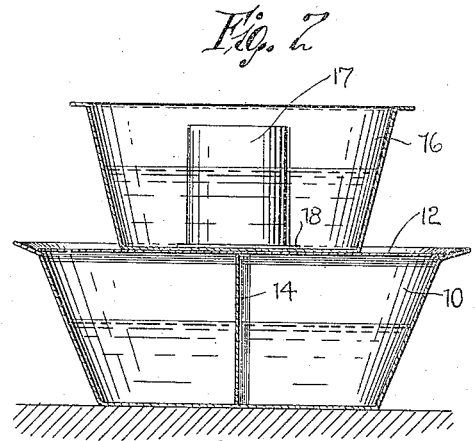
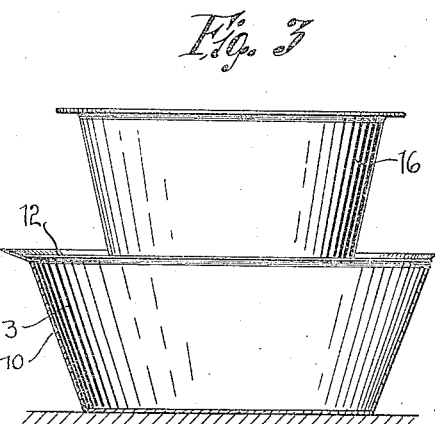
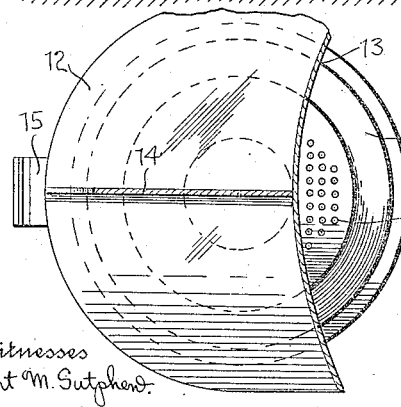
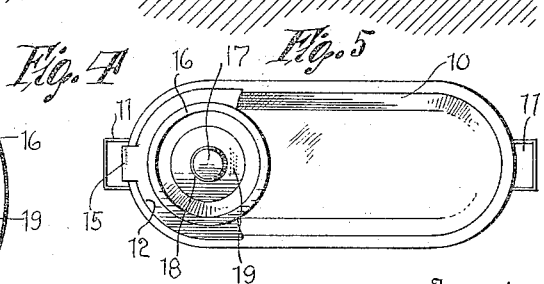
Witnesses
Robert M. Sutphen
Ross J. Woodward
Inventor
Odin P. Grande
By E. E. Vrooman
his Attorney

UNITED STATES PATENT OFFICE.

ODIN PEDERSEN GRANDE, OF PENSACOLA, FLORIDA.

DISH-DRAINER.

1,165,665.　　Specification of Letters Patent.　　Patented Dec. 28, 1915.

Application filed March 20, 1913. Serial No. 755,732.

*To all whom it may concern:*

Be it known that I, ODIN P. GRANDE, a citizen of the United States, residing at Pensacola, in the county of Escambia and State of Florida, have invented certain new and useful Improvements in Dish-Drainers, of which the following is a specification, reference being had therein to the accompanying drawing.

This invention relates to dish drainers and the principal object of the same is to provide a combination washing pan and draining pan, the draining pan being removably connected with the washing pan so that when desired it may be readily removed. This draining pan is secured above the washing pan, and is provided with openings in its bottom so that when water is poured upon the dishes in the draining pan to rinse them, it may flow out through the openings in the bottom of the pan, and into the dish pan.

This invention is illustrated in the accompanying drawings, wherein—

Figure 1 is a longitudinal sectional view through the dishpan. Fig. 2 is a section along the line 2—2 in Fig. 1. Fig. 3 is a section along line 3—3 in Fig. 1. Fig. 4 is a section along the line 4—4 of Fig. 1. Fig. 5 is a reduced top plan view of the dishpan.

Referring to the accompanying drawings, it will be seen that this invention comprises a washing pan 10 provided with handles 11 and which is preferably of an elongated form. The draining pan is supported above the dish pan to one side of the center of the pan, and is provided with a support which fits into the washpan. This base is formed from a plate 12 which is substantially semi-circular, and carries a depending tongue 13 which extends down to the bottom of the washing pan, and divides the washing pan into two sections. A supporting web 14 is secured to the under face of the plate 12, and extends at right angles to the tongue 13, and extends from the tongue to the end of the washing pan so that the plate will be braced against moving toward the end of the pan. A tongue extends from the outer end of the plate 12, and forms a catch 15 which engages the end of the pan so that the support will be prevented from moving toward the center of the washing pan. The draining pan 16 is mounted upon the plate 12, and may be of any shape desired, but in the preferred form is circular. This pan is provided with a central abutment 17 which has its lower end provided with a flange 18 by means of which it is secured to the bottom of the draining pan. This abutment forms a stop so that plates and other dishes which are placed in the draining pan will be prevented from slipping down to the bottom of the pan and lying flat in the pan where they are liable to collect water. It should be noted that the draining pan overhangs the edge of the plate 12 and is provided with the openings 19, so that water which is poured upon the dishes placed in the draining pan to rinse them may drain out through the bottom of the draining pan into the washing pan.

When using this device, the draining pan has its support placed as shown in Fig. 1, and the washing pan is then filled with water in which the dishes are placed, which are to be washed. After the dishes have been washed they are placed in the draining pan and are set on edge as indicated by the dotted lines in Fig. 1. After the draining pan is filled with dishes, hot water is poured upon the dishes in the draining pan so that the soapy water is rinsed off thus thoroughly cleansing the dishes. This water drains out through the openings 19 into the washing pan 10, and serves to heat the water in the washing pan. It will be evident that the rinsing water may be as hot as desired, since the water does not collect in the draining pan, and therefore it is not necessary to place the hands in the water in order to remove the dishes, thereby making it possible to use water a great deal hotter than would be possible if the water collected in the draining pan. It will also be evident that the same water which is used for rinsing the dishes may also serve to replenish and reheat the water in the washing pan. After the dishes have all been washed, the draining pan is removed from the washing pan, and the washing pan can then be cleaned and the water dumped out.

What is claimed is:—

A dish drainer of the class described comprising an elongated body, a centrally located supporting web positioned near one end of said body extending vertically thereof, a supporting plate positioned upon the top of said body and resting upon the top edge of said supporting web, said body provided with a flared periphery around the upper edge thereof a spring latch carried by said plate and adapted to overhang said flared edge for holding said plate firmly upon said body, a curved tongue positioned within said body and adapted to constitute an abutment wall for holding said plate against longitudinal movement upon said body in one direction.

In testimony whereof I hereunto affix my signature in presence of two witnesses.

ODIN PEDERSEN GRANDE.

Witnesses:
J. N. ANDREWS,
C. M. ANDREWS.